Patented Oct. 20, 1936

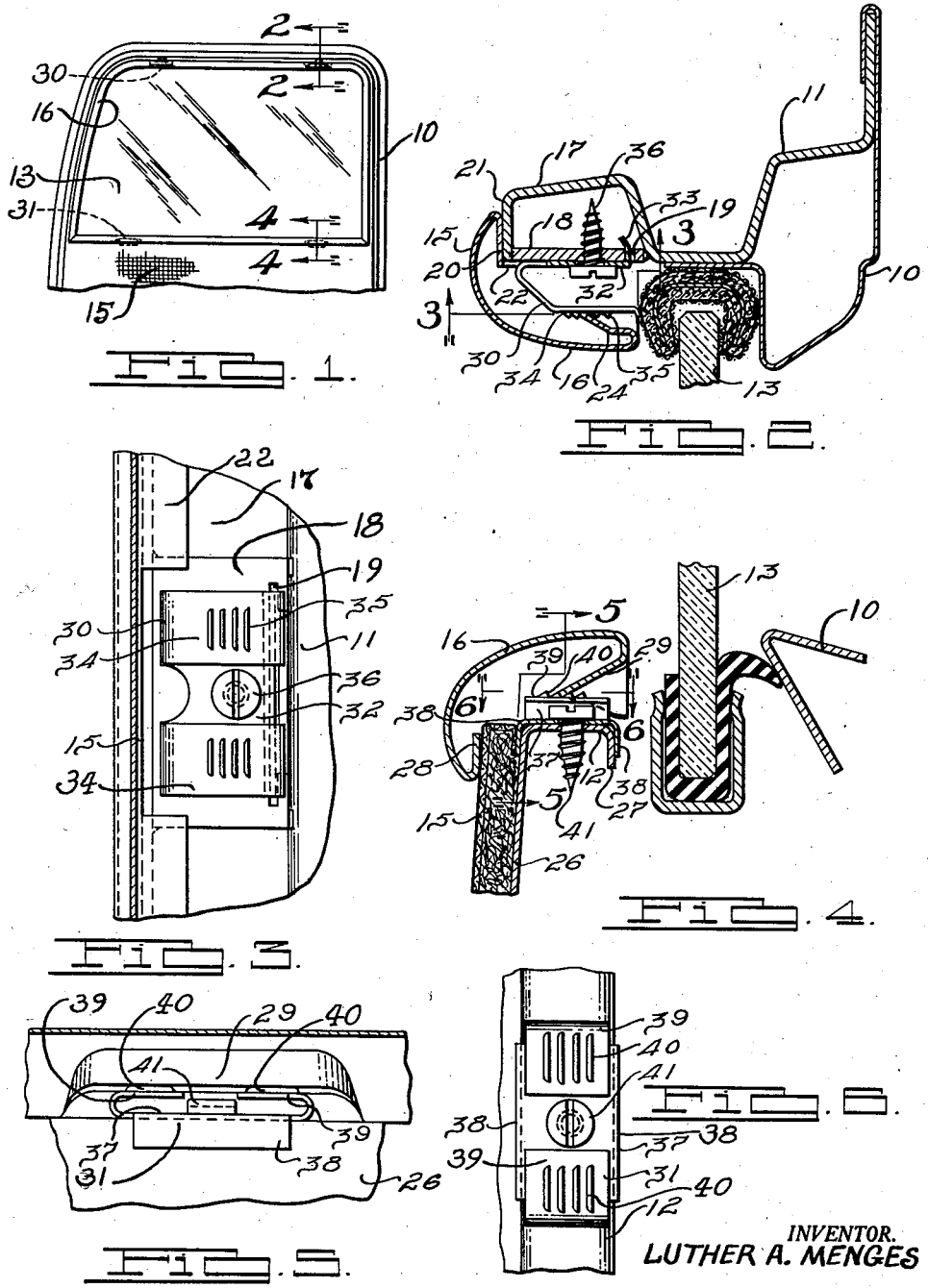

2,058,248

UNITED STATES PATENT OFFICE 2,058,248

GARNISH MOLDING AND SECURING MEANS THEREFOR

Luther A. Menges, Detroit, Mich., assignor to Chrysler Corporation, Detroit, Mich., a corporation of Delaware Application March 9, 1934, Serial No. 714,773

6 Claims. (Cl. 296—44)

This invention relates to an improved garnish molding and to improved means for securing the latter to a support.

Securing means embodying the invention are particularly adapted for use in detachably mounting continuous frame-like moldings on the structure surrounding window openings of houses, vehicle bodies and similar constructions.

Heretofore, the practice has been to secure such molding in place by screws or the like, inserted through the molding into the framework of the window or other part of the body. This practice requires the accurate aligning of apertures of the molding with apertures of the supporting member. Use of screws or other similar means necessitates countersinking of the apertures of the molding in order that the screw heads may be flush with the surface. If a slight misalignment should occur the heads of the screws extend diagonally of the countersunk recesses and project outwardly beyond the latter. Loosening of the screw-like securing means frequently occurs with an accompanying excessive amount of rattling.

One of the main objects of the invention is to provide molding fastening means which are free from the foregoing objections.

Another object of the invention is to provide cooperating securing means on a mounting and its supporting structure which are detachably engageable by a snap-on action.

Further objects of the invention are to provide completely concealed fastening elements in a window frame and a window molding assembly which are adapted to detachably fix the molding to the frame structure; to provide resilient means of this character which are normally held under compression between the molding and its support and so constructed and arranged as to prevent movement of the molding and eliminate rattling due to alternate separatory movement and contacting engagement of the metal structure such parts conventionally include; to provide resilient means of this character which are readily adapted in connection with conventional types of molding in frames or other similar structures of varying sizes; to provide such means possessing sufficient adjustability to compensate for wear incidental to the parts; and to provide on one side of an opening means of this character possessing sufficient yieldability to accommodate movement of the molding toward such side to permit removal of the molding from the frame.

Other objects and advantages of the invention will be more apparent from the following description taken in connection with the drawing, in which:

Fig. 1 is a side elevational view of a vehicle door having a window opening provided with a molding which is constructed and mounted according to my invention.

Fig. 2 is a vertical sectional view taken on line 2—2 of Fig. 1.

Fig. 3 is a horizontal fragmentary sectional view taken on line 3—3 of Fig. 2.

Fig. 4 is a vertical sectional view taken on line 4—4 of Fig. 1.

Fig. 5 is a fragmentary vertical sectional view taken on the line 5—5 of Fig. 4.

Fig. 6 is a plan view of one of the elements of my improved securing means as it appears when viewed from the line 6—6 of Fig. 4.

In the form shown, my invention is illustrated in conjunction with a window opening of a vehicle door 10 which includes a window frame having upper and lower horizontal sides 11 and 12, respectively. The door 10 has a channel runway in which is slidably received a window glass panel 13. Below the window opening of the door 10 is a conventional upholstery panel 15. A one piece garnish molding 16 is secured about the window opening and extends into the frame.

In Figs. 2 and 3 I have illustrated the assembly of the molding at the upper horizontal side of the opening, together with the securing means, while in Figs. 4, 5, and 6 I have illustrated the assembly at the lower horizontal side of the opening, together with the securing means.

That part of the upper side frame member 11 inwardly of the channel runway for the glass panel 13 comprises a channel portion 17 which is provided with spaced plate-like cross members 18, each having a slot 19. The body portion of the molding 16 is of arcuate shape in cross section and has a flange 20 disposed adjacent the side 21 of the channel 17. The flange 20 has a second flange 22, bent at right angles thereto, which is disposed adjacent the lower side of the member 18 and is provided with a notch for accommodating securing means hereinafter more fully described. The other edge of the molding has a reversely bent flange 24 which is in engagement with the securing means.

The lower side frame member 12 comprises depending flanges 26 and 27, the upholstery panel 15 being disposed adjacent the flange 26. The molding 16 has an edge portion reversely bent to form the flange 28 which bears against the panel 15. The other edge portion of the molding has a depending flange 29, which, in assembled position, is pressed inwardly of the molding body for engagement with my improved securing means.

To retain the molding in assembled position with the supporting structure of the frame, I have provided resilient securing means in the form of substantially U-shaped metallic clips or brackets 30 and 31, disposed at the upper and lower sides, respectively, of the window opening. The clip 30 comprises a base or end portion 32 which is disposed adjacent the lower side of the cross member 18 of the channel 17. The base 32 has one side portion bent at substantially right angles to form a flange 33 which extends through the slot of the member 18. The other side portion of the base 32 has a section of the metal removed providing spaced legs forming second end portions 34 which are reversely bent into overlapping but spaced relation with the base. Each of the legs 34 thus projects cantilever-like from the end portions 32 and has formed thereon spaced projections 35 between which is received the flange 24 of the molding 16. The end portions 32 and 34 are connected through the intermediate yielding portion of the bracket. The clip is held in fixed position by a screw 36 threaded in registering apertures in the base 32 and cross member 18, respectively.

The clip 31 employed in the assembly of the molding at the lower side of the opening has a base 37 on the opposite edges of which are formed flanges 38 in substantial parallel relation and which embrace the lower frame member 12. Formed on the other opposite edges of the base 37 are flanges 39 which are reversely bent into overlapping relation with the base and have formed thereon spaced projections 40 between which is received the flange 29 of the molding 16. The clip 31 is held in fixed position relative to the frame 12 by a screw 41 threaded in registering apertures in the base 37 and frame 12, respectively.

In assembling the structure, the molding is first placed in position at the lower horizontal side of the window opening, the flange 29 having been forced inwardly with respect to the body of the molding and received between the projections 40 of the clip 31, and the flange 28 bearing against the upholstery panel 15. The upper horizontal side of the molding is inclined from the plane of the door structure during the above operation, but is subsequently moved toward that plane, the flange 24 of the molding bearing against the outer surface of the legs 32 of the clip 30 and deflecting them from their normal position. The upper side of the molding has reached its innermost position when the flange 20 is in abutting relation with the leg 21 of the channel 17, and the flange 24 then falls into the groove between the projections 35 of the clip 31. If it is desired to remove the molding, the lower horizontal portion may be raised, the clips 31 possessing sufficient yieldability to accommodate upward movement whereby the flange 29 of the molding is removed from the groove of the projections 40 of the clip 31.

While I have shown in Fig. 1 four clips, two of which are disposed on opposite sides of the opening, it should be understood that the number and location of such securing means is to be determined from a consideration of the size of the opening and the character of the molding.

Although but one specific embodiment of the invention is herein shown and described, it will be understood that various changes in the size, shape and arrangement of parts may be made without departing from the spirit of my invention, and it is not my intention to limit its scope other than by the terms of the appended claims.

What I claim is:

1. In a structure having a window opening, a continuous frame-like molding extending into said opening, and resilient means disposed between said structure and molding for retaining the latter in position, said resilient means comprising a bracket having a base portion in engagement with said structure and a reversely bent flange provided with spaced projections between which an edge portion of said molding is disposed.

2. Means for securing a part to be supported to a support comprising a resilient member having a substantially flat base portion provided with flanges on opposite edges and in substantially parallel relation for engaging the support, and flanges on other opposite edges of said base portion extending in overlapping relation thereto, the last named flanges having spaced projections for receiving an edge portion of the part to be supported.

3. Means for securing a part to be supported to a support comprising a resilient member having a base portion, a flange extending at right angles from said base portion for engagement with said support, and a return bent portion having spaced projections for receiving an edge portion of the part to be supported.

4. In a structure providing a window opening, a molding adapted for attachment to said structure, and resilient means disposed between said structure and molding and comprising substantially parallel spaced arms respectively engageable with said structure and molding and an intermediate yielding portion connecting said arms, one of said arms being free for deflection in a direction toward the other in response to movement of said molding into attaching position, said latter arm having spaced projections receiving an edge portion of said molding when the latter is in assembled position.

5. In a structure providing a window opening, a molding adapted for attachment to said support, a bracket having an end portion fixed relative to said structure, said bracket having a second end portion projecting cantilever-like from said first end portion and adapted for yielding engagement with said molding, said second end portion having means for selectively retaining said molding in one of a plurality of positions relative to said opening.

6. In a structure providing a window opening, a molding adapted for attachment to said structure, means including a bracket for detachably securing said molding to said structure, said bracket having spaced arms respectively engageable with said structure and said molding, one of said arms being free for deflection in a direction toward the other in response to movement of said molding into attaching position, said latter arm having means for selectively retaining said molding in one of a plurality of positions relative to said opening.

LUTHER A. MENGES.